United States Patent [19]
Lu

[11] Patent Number: 6,049,947
[45] Date of Patent: Apr. 18, 2000

[54] BARBECUE TOOL ASSEMBLY

[76] Inventor: Nai-Pin Lu, 6F, No. 705, Da Dun Road, Taichung, Taiwan

[21] Appl. No.: 09/143,760

[22] Filed: Aug. 31, 1998

[51] Int. Cl.[7] .................................................. A45C 13/22
[52] U.S. Cl. .................. 16/422; 403/109.3; 403/327; 16/405; 16/406
[58] Field of Search .................. 16/405, 406, 113.1, 16/429, 422, 114.1; 403/376, 377, 378, 379.5, 109.3, 327

[56] References Cited

U.S. PATENT DOCUMENTS

| | | | |
|---|---|---|---|
| 2,291,593 | 7/1942 | Hubbard | 16/115 X |
| 4,577,837 | 3/1986 | Berg et al. | 254/212 |
| 4,595,383 | 6/1986 | Nienhaus | 464/162 |
| 5,287,869 | 2/1994 | Wu | 135/25.1 |
| 5,694,663 | 12/1997 | Tserng | 16/115 |
| 5,806,143 | 9/1998 | Tsai | 16/115 |
| 5,915,712 | 6/1999 | Stephenson et al. | 280/304.1 |

*Primary Examiner*—Anthony Knight
*Assistant Examiner*—Alison K. Pickard
*Attorney, Agent, or Firm*—Charles E. Baxley, Esq.

[57] ABSTRACT

A barbecue tool device comprises a handle with a lateral orifice for engagingly receiving a locking device and one or more tool metal heads having a shank slidable movable in the handle. The shanks of tool metal head comes with a pair of side walls having two or more notches each. The locking device includes a pair of catches engagingly received in the orifices and a spring sitting between the two catches for pushing the catches into the notches of the shank to be locked with the handle, the catches have a slot each for receiving the side walls of the shank and allowing the tool metal head to travel freely in the handle. The tool device may consist of a number of tool metal heads having a shank for selectively engaging with the handle when required.

5 Claims, 6 Drawing Sheets

BARBECUE TOOL ASSEMBLY

BACKGROUND OF THE INVENTION

1. Field of the Invention

The present invention relates to a tool, particularly to a barbecue tool having a handle for assembly with various tool metal heads.

2. Description of the Prior Art

Typical barbecue tools comprise a number of metal heads, such as fork, tongs, spatula, etc. Each tool has a fixed plastic or wood handle, which can not be extended for easy operation or retracted for compact storage. And each metal head can not be interchangeable with one another.

SUMMARY OF THE INVENTION

The invention described herein overcomes the problems of the prior art devices.

The primary objective is to provide the end users with a tool assembly having a handle for engaging with a number of tool metal heads.

In its principal embodiment, the invention herein is a tool assembly comprising a handle having a chamber formed therein with an orifice on both sides, a built-in locking device having two locking studs and a center spring, and one U-shaped long stem metal tool head retractably movable into the handle.

DETAILED DESCRIPTION OF THE PREFERRED EMBODIMENTS

Figure 1:
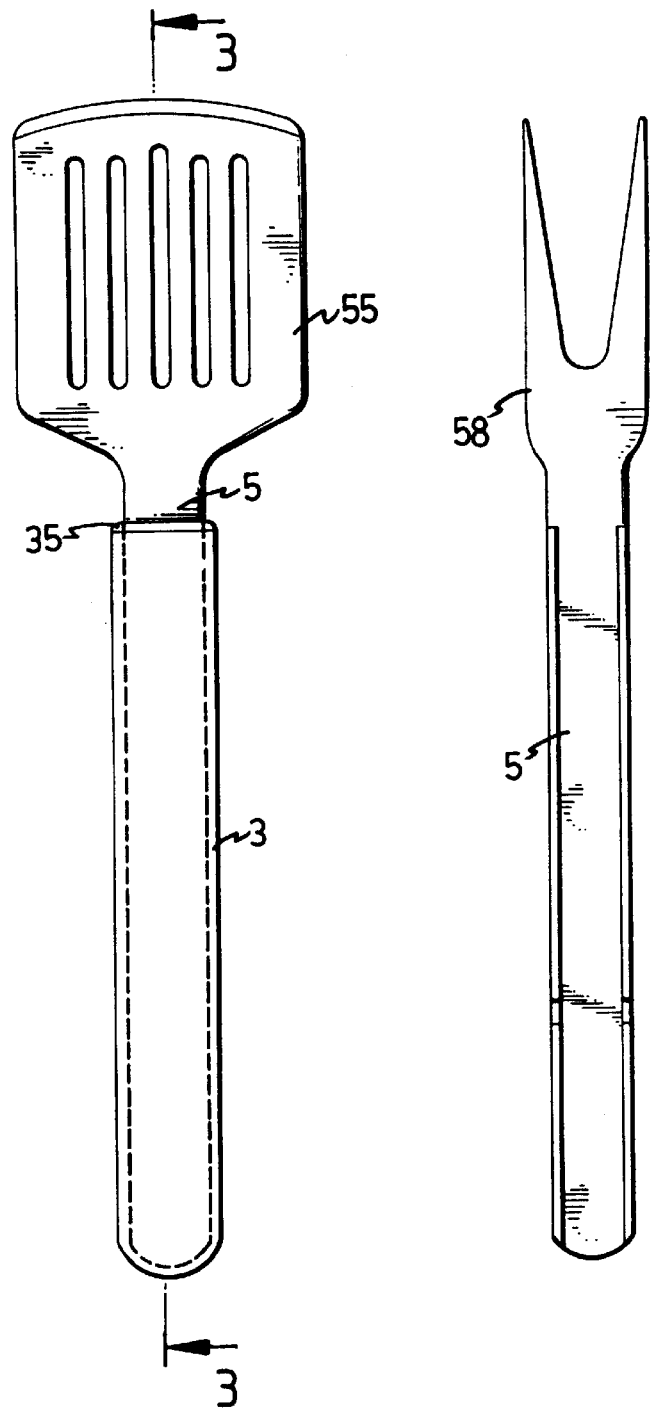
FIG. 1 is a plan view of a barbecue tool assembly of this invention.
Figure 2:
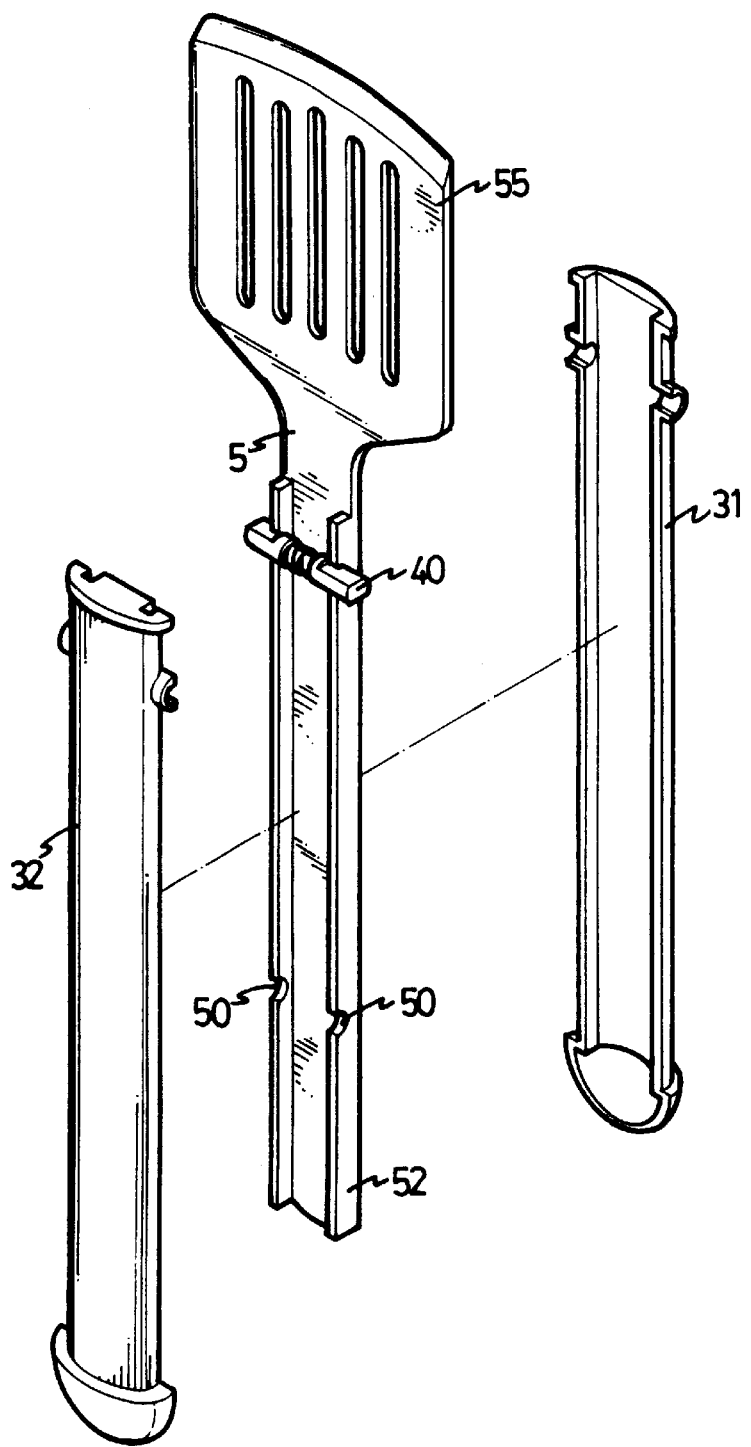
FIG. 2 is an exploded view of the tool assembly of FIG. 1.
Figure 3:
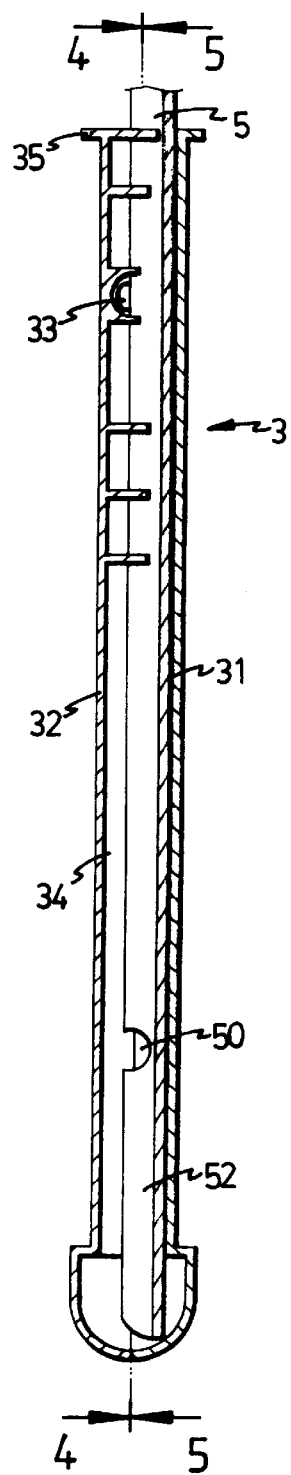
FIG. 3 is a cross sectional view taken on line 3—3 of FIG. 1.
Figures 4, 5:
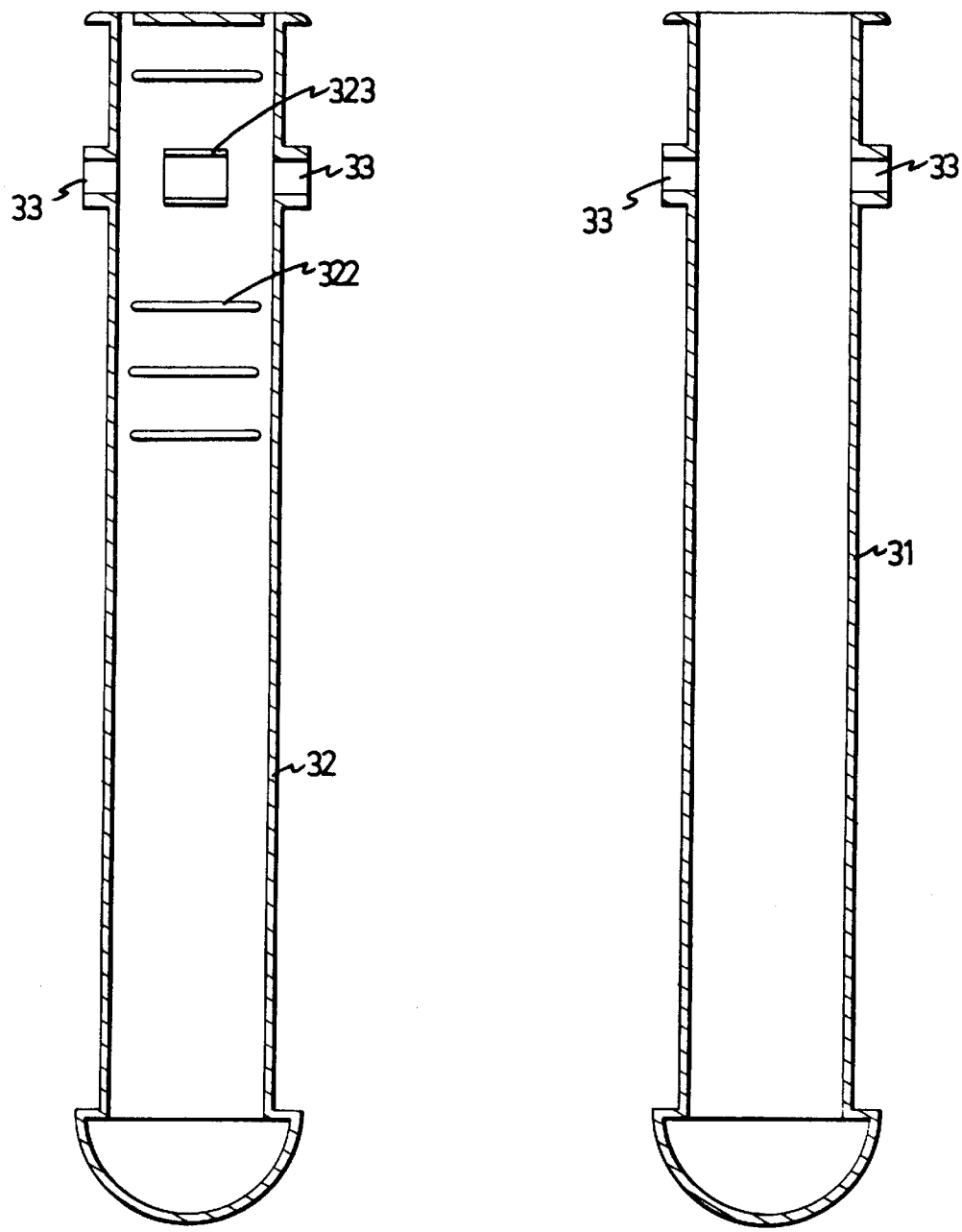
FIGS. 4 and 5 are cross sectional views taken on lines 4—4 and 5—5 of FIG. 3 respectively, in which the tool metal head has been removed.
Figure 8:
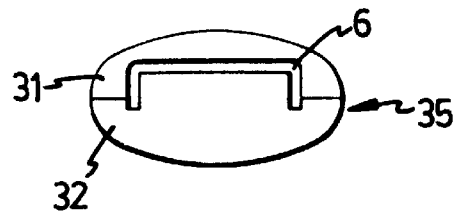
FIG. 8 is an end view of the handle.
Figure 6:
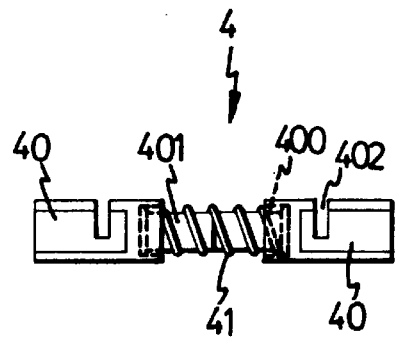
FIG. 6 is a plan view of the locking device.
Figure 7:
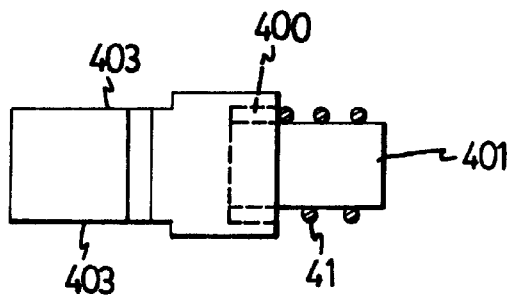
FIG. 7 is an enlarged top plan view of the locking device.

The invention herein is best understood by reference to the drawings 1–5, the barbecue tool assembly of this invention is illustrated generally in FIG. 1–5, it comprises a handle 3 and one or more tool metal heads 55,58 (FIG. 1) to be selectively engaged with the handle 3. The handle 3 consists of inner core 31,32 and outer grip with inner core 31, 32 preferably fastened by adhesive, welding or fasteners. The handle 3 has a chamber 34 formed therein for sliadably receiving the shank 5 of the tool metal heads 55, 58 with an orifice 33 on each sides to trap the locking device 4 in the handle. The lower part of the inner core 32 of the handle 3 comprises a number of reinforcement ribs 322 and a channel 323 aligned with the orifice 33 for the locking device 40 (FIGS. 6,7,9,10) to move on. The orifice 33 of FIGS. 4 & 5 is a square opening (FIG. 3) smaller than the locking device to keep it in the closed compartment formed by upper 31 and lower 32 part of the inner core when assembled. The handle 3 has an end plate 35 and a U-shaped groove 6 (FIG. 8). The tool metal heads 55 with the matching stem can move retractably in the handle 3, the tool metal head 5 with U-shaped stem is shown in FIGS. 2 & 3. The side wall 52 of the tool stem can have two or more notches 50.

On FIGS. 2,6,7 and 9,10, the locking device 4 consists of two Built-in catches 40 and a spring 41. The catches 40 have an annular recess 400 at the back for receiving the end portions of the spring 41 and a smaller front end with flat sides 403 (FIG. 7) for slidably engaging with the square openings (FIG. 3) at the orifice 33 of the handle 3 for preventing the catches 40 from rotating. The catches 40 each further includes an extension 401 to go through the spring 41 and keep the spring 41 in channel 323. The catches 40 each has a slot 402 to provide tool metal heads 55,58 with a track to travel smoothly in the handle 3.

Figure 10:
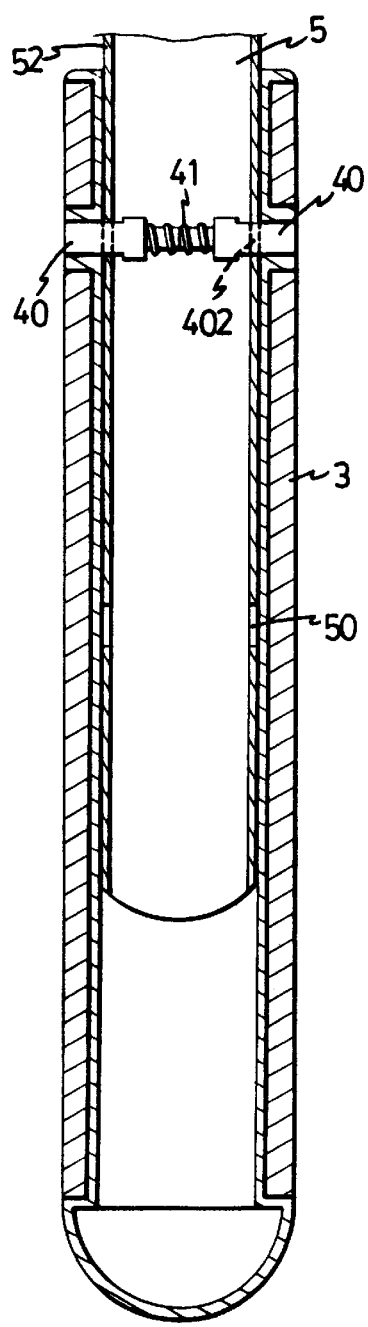
FIG. 10 is a partial cross sectional view similar to FIG. 9, illustrating the engagement of the locking device with the tool metal head and the handle.
Figure 9:
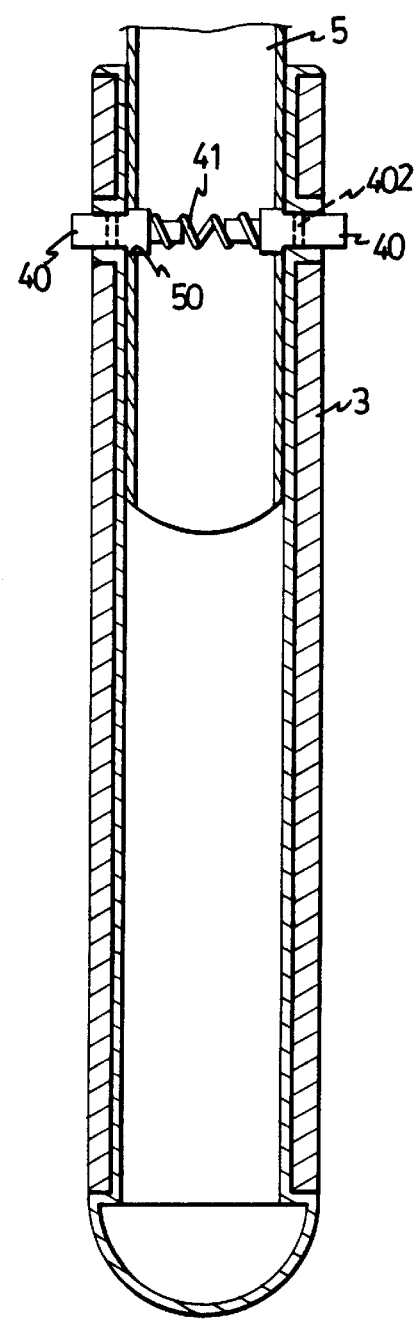
FIG. 9 is a partial cross sectional view taken on line 4—4 of FIG. 3, illustrating the engagement of the locking device with the tool metal head and the handle.

In operation, as shown in FIG. 10, the tool metal heads 55,58 travel along the slots 402 of the catches 40 and spring 41 is in compressed position. FIG. 9 indicates the tool metal heads 55,58 can be extended and locked when the catches 40 are disengaged from the side walls 52 of the tool shank 5 and spring 41 is released. The tool metal head is retractably movable into the handle 3 when the catches 40 are depressed against each other on the tail extension 401. The passage of the tool metal part is regained when the slots 402 are aligned with the side walls 52 of the tool shank 5, the length of the barbeque tool can further be adjusted if two or more notches 50 on the side wall 52 of the tool stem are intentionally made.

The barbecue tool assembly of this invention may be conveniently extended for the required length and easily retracted for compact storage. Different tool heads can be used on a universal handle with the above device.

Although this invention has been described with a certain degree of particularity, it is to be understood that the present disclosure has been made by way of example only and the numerous changes in the detailed construction and the combination and arragement of parts may be resorted to without departing from the spirit and scope of the invention as hereinafter claimed.

What is claimed is:

1. A tool assembly comprising:

a handle having a chamber and a pair of orifices laterally formed therin for communicating with said chamber, a tool metal head with U-shaped shank to correspond with said chamber of said handle, said shank comprising a pair of side walls with at least two notches formed therein, a locking device including a pair of catches slidably engaged in said orifices of said handle, said catches each having a slot for receiving said side walls of said shank, and an extension spring for pushing said catches sideward into said notches of said shank for positive locking, and said shank is locked unto said handle when said catches enter said notches of said shank, said shank is unlocked and retractably movable in said handle by forcing said catches against each other.

2. The tool assembly according to claim 1 further comprising coordinating parts for preventing said catches from rotating in said handle.

3. The tool assembly according to claim 2, said orifices of said handle have square openings for keeping said catches having a coordinating square head in said handle and preventing said catches from rotating in said handle.

4. The tool assembly according to claim 1, wherein said extension spring is positioned between said catches, and said catches having a tail extension formed therein.

5. The tool assembly according to claim 1, said handle includes an end plate having a U-shaped groove formed therein, said shank has a U-shaped cross section for travelling through said U-shaped groove of said end plate.

\* \* \* \* \*